COKING PROCESS WITH POLYMERIZATION OF THE LIQUID PRODUCTS
Filed April 20, 1965
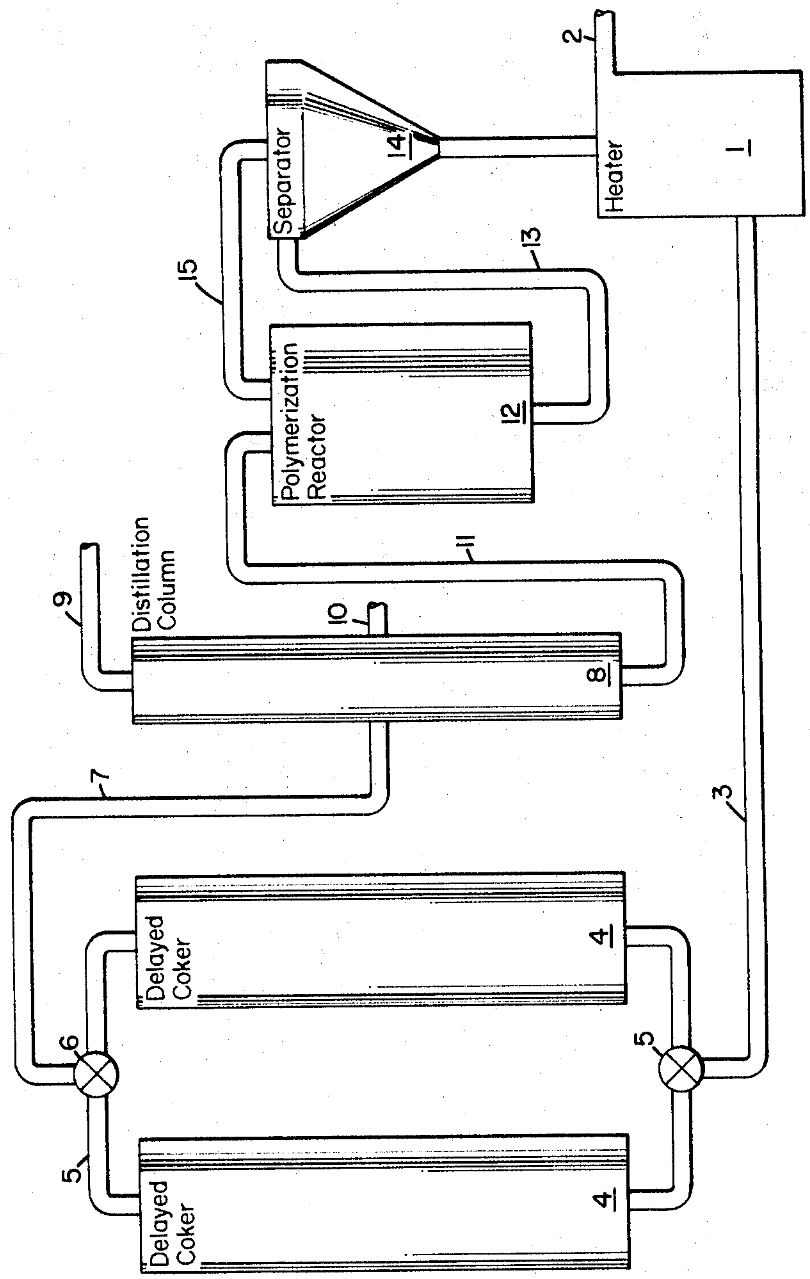
INVENTOR
JAMES A. BIEHL
BY Joseph C. Herring
ATTORNEY United States Patent Office 3,389,074

Patented June 18, 1968

3,389,074

COKING PROCESS WITH POLYMERIZATION OF THE LIQUID PRODUCTS

James A. Biehl, Robinson, Ill., assignor to Marathon Oil Company, Findlay, Ohio, a corporation of Ohio Filed Apr. 20, 1965, Ser. No. 449,415

13 Claims. (Cl. 208—53)

This invention relates to the coking of hydrocarbons and more particularly to a process of coking wherein a portion of the volatiles arising from the coking operation is polymerized and utilized as coker feed stock.

High quality petroleum coke is a highly crystalline material which finds many industrial uses. The demand for petroleum coke and delayed coke particularly has increased substantially over the past few years. To meet this demand, the process of this invention enables increased amounts of coke to be manufactured per barrel of coker feed stock.

Generally, the process of this invention comprises injecting a heated hydrocarbon coker feed stock into a coking zone and allowing the hydrocarbon to coke. The volatile hydrocarbons evolving from the coking feed stock are passed into a hydrocarbon fractionation zone. The bottoms from the fractionation zone are polymerized, and the polymerization products fractionated. The bottoms from this second fractionation are then, where necessary, reheated and utilized as feed stock for coke production while lighter fractions are returned to the process ahead of the polymerization zone.

This process is more fully illustrated by reference to the attached drawing. In the depicted process, a delayed coker feed stock such as reduced crude, vacuum residuum, thermal tar, and other petroleum residua are passed into heater 1 through conduit 2. After being heated from a temperature ranging from about 420° C. to about 595° C. and preferably from about 480 to about 540° C., the flow of heated feed stock is controlled to a line 3 and to an empty delayed coker 4 through valve 5. After being filled, one of the cokers 4 is allowed to remain quiescent while the other coker 4 is being filled and until the coker feed stock in the quiescent coker is coked to a desired degree. Normally, a two-day cycle is utilized. The volatile hydrocarbons from the coking reaction are directed through valve 6 into line 7 and distillation column 8. Distillation column 8 is maintained at a temperature of from about 410 to about 485° C. A desirable temperature is about 315° C. at the top of the column and about 400° C. bottom temperature. A desired number of fractions may be recovered from column 8. Thus, feed for an ethylene unit can be taken off through line 9, a 315° C. mid distillate cut can be taken off through line 10 while a bottoms cut can be removed via line 11. This bottoms cut is introduced into polymerization reactor 12. In a thermal polymerization reactor, the temperature is maintained at temperatures of from about 260 to 540° C., and preferably from about 400 to 510° C. and at a pressure in excess of about 3.3 atm. Preferably, reactor pressures should be on the order of from about 10 to about 20 atm. A preferred set of thermal polymerization conditions is about 455° C. and about 10–11 atm. A one-half hour residence time in a thermal reactor is normally sufficient to produce substantial amounts of polymerized material. The products from reactor 12 are passed through line 13 into separator 14. Separator 14 can be a distillation unit but is preferably a flash separator maintained at a temperature about that of column 8. The volatiles from separator 14 are passed through line 15 into reactor 12 while fluids from separator 14 are passed into heater 1 from whence they are returned to a delayed coker 4.

While the coking process of this invention has been described with respect to a depicted embodiment, it is to be understood that the over-all process is applicable to any petroleum coking operation. Thus, delayed cokers 4 could be replaced by a fluidized coking unit, or a coking unit wherein the heated coking stock is deposited on a fresh surface, such as a drum, or other coking device. In a fluidized bed coking process, the fluidized coking unit is maintained at from about 510° C. to about 540° C. Other modifications are obvious to those skilled in the art and are intended to be included within the scope of this invention as claimed. For example, the volatiles from separator 14 could be introduced into column 8 rather than reactor 12. Heater 1 could be dispensed with should a coker feed stock of desirable temperature be otherwise available.

Now having described my invention, what I claim is:

1. The process comprising coking a petroleum residuum, fractionating hydrocarbon vapors from said coking to form a bottoms fraction and at least one other fraction, polymerizing the bottoms fraction, fractionating the product of the polymerization into a polymerized bottoms fraction and at least one other fraction, and coking the polymerized bottoms fraction.

2. The process comprising coking, under coking conditions, a petroleum residuum in a coking zone, conducting the hydrocarbon volatiles from the coking zone to a coking zone effluent fractionator, fractionating the volatiles to form a bottoms fraction and at least one other fraction, conducting the bottoms fraction to a polymerization reactor, polymerizing the bottoms fraction, conducting the polymerization reactor effluent to a second fractionator, fractionating the polymerization reactor effluent into a polymerized bottoms fraction and at least one other fraction, and recycling the polymerized bottom fraction to the coking zone.

3. The process comprising coking, under coking conditions, a petroleum residuum in a coking zone, conducting the hydrocarbon volatiles from the coking zone to a coking zone effluent fractionator, fractionating the volatiles to form a bottoms fraction and at least one other fraction, conducting the bottoms fraction to a polymerization reactor, polymerizing the bottoms fraction, conducting the polymerization reactor effluent to a second fractionator, fractionating the polymerization reactor effluent into a polymerized bottoms fraction and at least one other fraction from said polymerization reactor, recycling one of said at least one other fraction from said polymerization reactor to said polymerization reactor, and recycling the polymerized bottom fraction to said coking zone.

4. The process comprising coking, under coking conditions, a petroleum residuum in a coking zone, conducting the hydrocarbon volatiles from the coking zone to a coking zone effluent fractionator, fractionating the volatiles to form a bottoms fraction and at least one other fraction, conducting the bottoms fraction to a polymerization reactor, polymerizing the bottoms fraction, conducting the polymerization reactor effluent to a second fractionator, fractionating the polymerization reactor effluent into a polymerized bottoms fraction and at least one other fraction from said polymerization reactor, recycling one of said at least one other fraction from said polymerization reactor to said coking zone effluent fractionator, and recycling the polymerized bottom fraction to the coking zone.

5. Coking at about 420 to about 595° C. a petroleum residuum in a coking zone, conducting the hydrocarbon effluent from the coking zone to a coking zone effluent fractionator, fractionating the coking zone effluent at temperatures ranging from about 375 to about 485° C. adjacent the bottom of the fractionating zone, conducting the bottoms fraction from the fractionating zone to a polymerization reactor, polymerizing the bottoms fraction, conducting the polymerization reactor effluent to a second fractionator, fractionating the polymerization zone effluent into a polymerized bottoms fraction at fractionator bottom temperatures of from about 375 to about 485° C. and to at least one other polymerization zone effluent fraction, and recycling the polymerized bottom fractions to the coking zone.

6. Coking at about 420 to about 595° C. a petroleum residuum in a coking zone, conducting the hydrocarbon effluent from the coking zone to a coking zone effluent fractionator, fractionating the coking zone effluent at temperatures ranging from about 375 to about 485° C. adjacent the bottom of the fractionating zone, conducting the bottoms fraction from the fractionating zone to a polymerization reactor, polymerizing the bottoms fraction, conducting the polymerization reactor effluent to a second fractionator, fractionating the polymerization zone effluent into a polymerized bottoms fraction at fractionator bottom temperatures of from about 375 to about 485° C. and to at least one other polymerization zone effluent fraction, recycling one of said at least one other polymerization zone effluent fraction to said polymerization reactor, and recycling the polymerized bottom fractions to the coking zone.

7. Coking at about 420 to about 595° C. a petroleum residuum in a coking zone, conducting the hydrocarbon effluent from the coking zone to a coking zone effluent fractionator, fractionating the coking zone effluent at temperatures ranging from about 375 to about 485° C. adjacent the bottom of the fractionating zone, conducting the bottoms fraction from the fractionating zone to a polymerization reactor, polymerizing the bottoms fraction, conducting the polymerization reactor effluent to a second fractionator, fractionating the polymerization zone effluent into a polymerized bottoms fraction at fractionator bottom temperatures of from about 375 to about 485° C. and to at least one other polymerization zone effluent fraction, recycling one of said at least one other polymerization zone effluent fraction to said coking zone effluent fractionator, and recycling the polymerized bottom fractions to the coking zone.

8. The process of claim 3 wherein the coking zone temperatures are maintained at from about 480 to about 540° C., the coking zone effluent fractionator temperature ranges from about 315° C. at the top of the fractionator to about 400° C. near the bottom of the fractionator, and the fractionated hydrocarbon bottoms from the fractionator are thermally polymerized at temperatures of from about 260 to about 540° C. and at a pressure in excess of about 3.3 atm.

9. The process of claim 3 wherein the coking step is by delayed coking.

10. The process of claim 3 wherein the coking step is by fluidized coking, and the coking zone is maintained at temperatures of from about 510 to about 540° C.

11. The device for maximizing coke production comprising a coker adapted to coke a hydrocarbon feed stock, a first hydrocarbon fractionator connected to receive volatiles from said coker and separate said volatiles into a bottoms fraction and at least one other fraction, a polymerization reactor connected to receive a bottoms fraction from said hydrocarbon separator and adapted to polymerize said bottoms fraction to a higher molecular weight material, a second hydrocarbon fractionator connected to receive the effluent of the polymerization reactor and adapted to separate said effluent into a bottoms fraction and at least one other fraction, and means for returning said bottoms fraction from said second hydrocarbon fractionator to said coker.

12. The device of claim 11 including a means of returning one of said at least one other effluent fraction to said polymerization reactor.

13. The apparatus of claim 11 including means for returning one of said at least one other effluent fraction to said first hydrocarbon fractionator.

References Cited

UNITED STATES PATENTS

| | | | |
|---|---|---|---|
| 2,727,853 | 12/1955 | Hennig | 208—53 |
| 2,733,283 | 1/1956 | Hammer | 260—683.1 |
| 2,853,434 | 9/1958 | Moser | 208—127 |
| 2,943,038 | 6/1960 | Hansen | 208—71 |

DELBERT E. GANTZ, *Primary Examiner.*

ABRAHAM RIMENS, *Examiner.*